(12) United States Patent
Surnilla et al.

(10) Patent No.: US 6,418,711 B1
(45) Date of Patent: Jul. 16, 2002

(54) METHOD AND APPARATUS FOR ESTIMATING LEAN $NO_X$ TRAP CAPACITY

(75) Inventors: Gopichandra Surnilla, West Bloomfield; David Karl Bidner, Livonia, both of MI (US); Grant Alan Ingram, West Lafayette, IN (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/649,783

(22) Filed: Aug. 29, 2000

(51) Int. Cl.$^7$ ............................................. F01N 3/00
(52) U.S. Cl. ........................... 60/277; 60/274; 60/276; 60/285
(58) Field of Search ..................... 60/274, 276, 277, 60/285, 295, 301

(56) References Cited

U.S. PATENT DOCUMENTS

| | | | |
|---|---|---|---|
| 5,509,267 A | 4/1996 | Theis | |
| 5,684,248 A * | 11/1997 | Iwata | 60/277 |
| 5,713,199 A | 2/1998 | Takeshima et al. | |
| 5,743,084 A | 4/1998 | Hepburn | |
| 5,771,685 A | 6/1998 | Hepburn | |
| 5,778,666 A * | 7/1998 | Cullen et al. | 60/285 |
| 5,832,722 A | 11/1998 | Cullen et al. | |
| 5,842,340 A * | 12/1998 | Bush et al. | 60/274 |
| 5,941,211 A * | 8/1999 | Brehob et al. | 60/285 |
| 5,950,421 A * | 9/1999 | Chattha et al. | 60/274 |
| 5,970,707 A | 10/1999 | Sawada et al. | |
| 5,974,788 A | 11/1999 | Hepburn et al. | |
| 6,138,453 A * | 10/2000 | Sawada et al. | 60/277 |
| 6,161,378 A * | 12/2000 | Hanaoka et al. | 60/285 |
| 6,171,565 B1 * | 1/2001 | Höhne et al. | 60/274 |
| 6,216,448 B1 * | 4/2001 | Schnaibel et al. | 60/285 |
| 6,216,449 B1 * | 4/2001 | Strehlau et al. | 60/285 |
| 6,244,046 B1 * | 6/2001 | Yamashita | 60/285 |

* cited by examiner

*Primary Examiner*—Thomas Denion
*Assistant Examiner*—Tu M. Nguyen
(74) *Attorney, Agent, or Firm*—Carlos Hanze

(57) ABSTRACT

A method and apparatus for determining the capacity of a trap to store $NO_x$ based on the change in oxygen storage in the trap occurring as a result of sulfation of the trap.

12 Claims, 3 Drawing Sheets

METHOD AND APPARATUS FOR ESTIMATING LEAN NO$_x$ TRAP CAPACITY

TECHNICAL FIELD

The invention relates to methods and apparatus for accessing the ability of a vehicle emissions control device, such as a lean NO$_x$ trap, to releasably store an exhaust gas constituent and, more particularly, to a method and apparatus for estimating the capacity of a lean NO$_x$ trap to store NO$_x$.

BACKGROUND ART

The exhaust gas generated by a typical internal combustion engine, as may be found in motor vehicles, includes a variety of constituent gases, including hydrocarbons (HC), carbon monoxide (CO), nitrogen oxides (NO$_x$) and oxygen (O$_2$). The respective rates at which an engine generates these constituent gases are typically dependent upon a variety of factors, including such operating parameters as air-fuel ratio ($\lambda$), engine speed and load, engine temperature, ambient humidity, ignition timing ("spark"), and percentage exhaust gas recirculation ("EGR"). The prior art often maps values for instantaneous engine-generated or "feedgas" constituents, such as HC, CO and NO$_x$, based, for example, on detected values for instantaneous engine speed and engine load (the latter often being inferred, for example, from intake manifold pressure).

To limit the amount of feedgas constituents that are exhausted through the vehicle's tailpipe to the atmosphere as "emissions," motor vehicles typically include an exhaust purification system having an upstream three-way catalyst and a downstream NO$_x$ absorbent or "trap." The three-way catalyst is particularly effective at reducing tailpipe NO$_x$ emissions when the engine is operated using an air-fuel mixture that is at or near a stoichiometric air-fuel ratio. The trap, in turn, stores NO$_x$ when the exhaust gases are "lean" of stoichiometry and releases previously-stored NO$_x$ for reduction to harmless gases when the exhaust gases are "rich" of stoichiometry. In this manner, the trap permits intermittent lean engine operation, with a view toward maximizing overall fuel economy, while concomitantly serving to control vehicle tailpipe emissions.

More specifically, in a typical embodiment, the trap chemically stores NO$_x$ during lean-burn operation using alkaline metals, such as barium and/or strontium, in the form of a washcoat. The NO$_x$ (NO and NO$_2$) are stored in the trap in the form of barium nitrate, for example. The washcoat also includes precious metals, such as platinum and palladium, which operate to convert NO to NO$_2$ for storage in the trap as a nitrate. The trap's washcoat typically also includes ceria, whose affinity for oxygen storage is such that, during initial lean engine operation, a quantity of the excess oxygen flowing through the trap is immediately stored in the trap. The amount of stored oxygen is essentially fixed, although it begins to lessen over time due to such factors as increased trap sulfurization (sulfur accumulation) and trap aging.

The trap's actual capacity to store NO$_x$ is finite and, hence, in order to maintain low tailpipe NO$_x$ emissions when running "lean," the trap must be periodically cleansed or "purged" of stored NO$_x$. During the purge event, excess feedgas HC and CO, which are initially consumed in the three-way catalyst to release stored oxygen, ultimately "break through" the three-way catalyst and enter the trap, whereupon the trap's barium nitrate decomposes into NO$_2$ for subsequent conversion by the trap's precious metals into harmless N2 and O$_2$. The oxygen previously stored in the trap is also released during an initial portion of the purge event after the HC and CO break through the three-way catalyst.

Each purge event is characterized by a fuel "penalty" consisting generally of an amount of fuel required to release both the oxygen stored in the three-way catalyst, and the oxygen and NO$_x$ stored in the trap. Moreover, the trap's NO$_x$-storage capacity is known to decline in a generally reversible manner over time due to sulfur poisoning or "sulfurization," and in a generally irreversible manner over time due, for example, to component "aging" from thermal effects and "deep-diffusion"/"permanent" sulfurization. As the trap's capacity drops, the trap is "filled" more quickly, and trap purge events are scheduled with ever-increasing frequency. This, in turn, increases the overall fuel penalty associated with lean engine operation, thereby further reducing the overall fuel economy benefit of "running lean."

In order to restore trap capacity, a trap desulfurization event is ultimately scheduled, during which additional fuel is used to heat the trap to a relatively elevated temperature, whereupon a slightly rich air-fuel mixture is provided for a relatively extended period of time to release much of the stored sulfur and rejuvenate the trap. As with each purge event, each desulfurization event typically includes the further "fuel penalty" associated with the initial release of oxygen previously stored in the three-way catalyst and the trap. The prior art teaches scheduling a desulfurization event only when the trap's NO$_x$-storage capacity falls below a critical level, thereby minimizing the frequency at which such further fuel economy "penalties" are incurred.

Accordingly, there is a need for a method and apparatus for accurately determining the NO$_x$-storage capacity or efficiency of a lean NO$_x$ trap in order to accurately schedule the desulfurization event as well as the purge event.

DISCLOSURE OF INVENTION

In accordance with the method of the present invention, the NO$_x$ absorption capacity is determined based on an estimate of the change in the oxygen storage capacity of the lean NO$_x$ trap. More particularly, after a desulfurization event is performed, to put the lean NO$_x$ trap in a known state, a number of estimates of the current value of oxygen storage capacity are determined in order to calculate a filtered or mean value of the oxygen storage capacity of the lean NO$_x$ trap when it is fresh. This initial capacity value is then stored in computer memory as a value P1 and also as a value P2 representing the current oxygen storage capacity of the trap. Subsequently, and at periodic time intervals the value of the current oxygen capacity of the trap is estimated and filtered and the value P2 is updated. The current trap capacity to absorb NO$_x$ is then determined as a function of the value of P2/P1. When the trap capacity to absorb NO$_x$ falls below a predetermined minimum capacity value, a desulfurization event is performed and the forgoing steps are repeated.

BEST MODE FOR CARRYING OUT THE INVENTION

Figure 1:
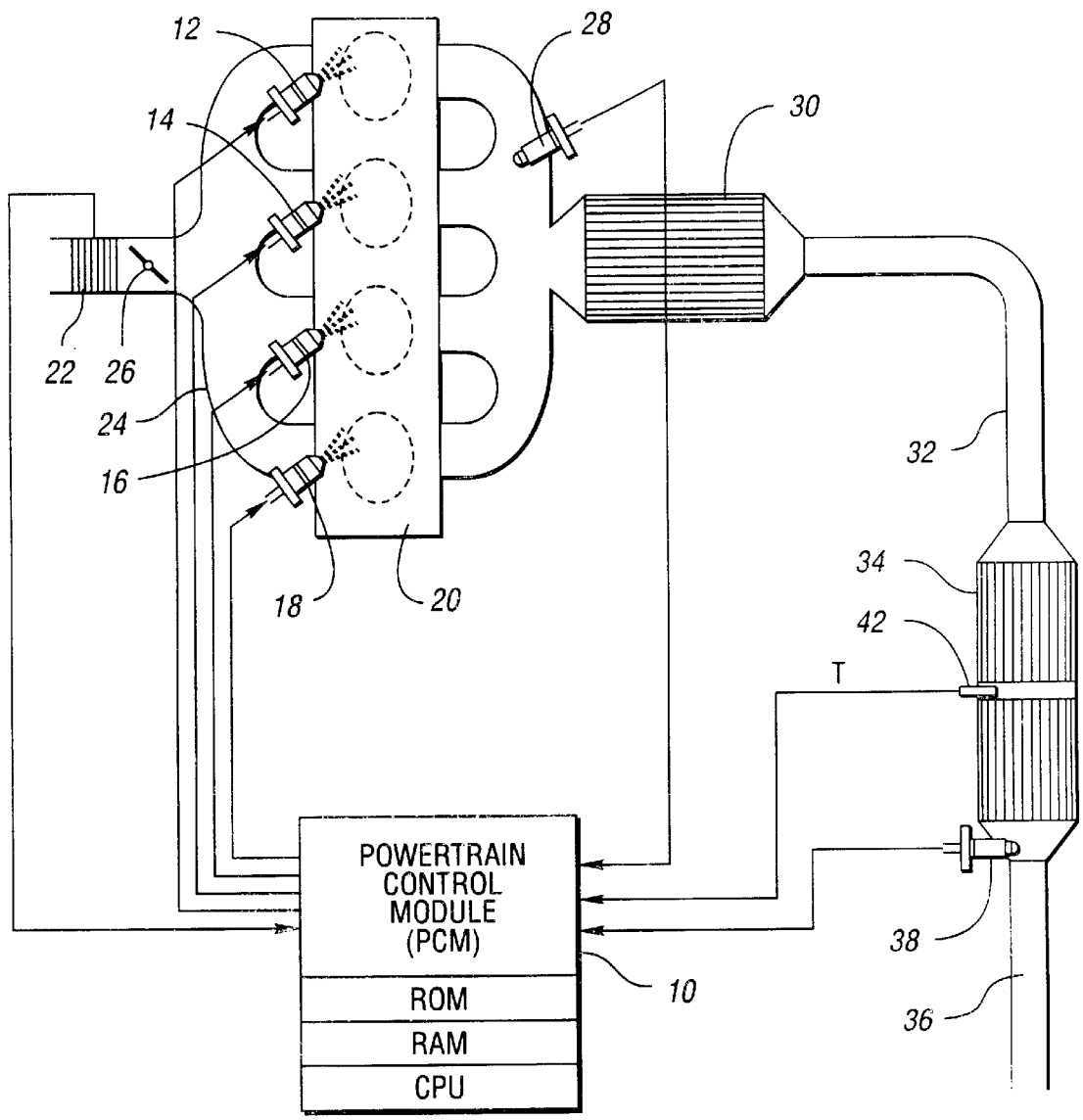
FIG. 1 is a schematic of an exemplary system for practicing the invention.

Referring to FIG. 1, a n exemplary control system 10 for a gasoline-powered internal combustion engine 12 of a motor vehicle includes an electronic engine controller 14 having a processor ("CPU"), input/output ports , an electronic storage medium containing processor-executable instructions and calibration values, shown as read-only memory ("ROM") in this particular example, random-access memory ("RAM"), "keep-alive" memory ("KAM"), and a data bus of any suitable configuration. The controller 14 receives signals from a variety of sensors coupled to the engine 12 and/or the vehicle as described more fully below and, in turn, controls the operation of each of a set of fuel injectors 16, each of which is positioned to inject fuel into a respective cylinder 18 of the engine 12 in precise quantities as determined by the controller 14. The controller 14 similarly controls the individual operation, i.e., timing, of the current directed through each of a set of spark plugs 20 in a known manner.

The controller 14 also controls an electronic throttle 22 that regulates the mass flow of air into the engine 12. An air mass flow sensor 24, positioned at the air intake to the engine's intake manifold 26, provides a signal MAF representing the air mass flow resulting from positioning of the engine's throttle 22. The air flow signal MAF from the air mass flow sensor 24 is utilized by the controller 14 to calculate an air mass value AM which is indicative of a mass of air flowing per unit time into the engine's induction system.

A first oxygen sensor 28 coupled to the engine's exhaust manifold detects the oxygen content of the exhaust gas generated by the engine 12 and transmits a representative output signal to the controller 14. The first oxygen sensor 28 provides feedback to the controller 14 for improved control of the air-fuel ratio of the air-fuel mixture supplied to the engine 12, particularly during operation of the engine 12 at or near the stoichiometric air-fuel ratio ($\lambda$=1.00). A plurality of other sensors, indicated generally at 30, generate additional signals including an engine speed signal N and an engine load signal LOAD in a known manner, for use by the controller 14. It will be understood that the engine load sensor 30 can be of any suitable configuration, including, by way of example only, an intake manifold pressure sensor, an intake air mass sensor, or a throttle position/angle sensor.

An exhaust system 32 receives the exhaust gas generated upon combustion of the air-fuel mixture in each cylinder 18. The exhaust system 32 includes a plurality of emissions control devices, specifically, an upstream three-way catalytic converter 34 and a downstream $NO_x$ trap 36. The three-way catalyst 34 contains a catalyst material that chemically alters the exhaust gas in a known manner. The trap 36 alternately stores and releases amounts of engine-generated $NO_x$, based upon such factors, for example, as the intake air-fuel ratio, the trap temperature T (as determined by a suitable trap temperature sensor, not shown), the percentage exhaust gas recirculation, the barometric pressure, the relative humidity of ambient air, the instantaneous trap "fullness," the current extent of "reversible" sulfurization, and trap aging effects (due, for example, to permanent thermal aging, or to the "deep" diffusion of sulfur into the core of the trap material which cannot subsequently be purged). A second oxygen sensor 38, positioned immediately downstream of the three-way catalyst 34, provides exhaust gas oxygen content information to the controller 14 in the form of an output signal SIGNAL0. The second oxygen sensor's output signal SIGNAL0 is useful in optimizing the performance of the three-way catalyst 34, and in characterizing the trap's $NO_x$-storage ability in a manner to be described further below.

The exhaust system 32 further includes a $NO_x$ sensor 40 positioned downstream of the trap 36. In the exemplary embodiment, the $NO_x$ sensor 40 generates two output signals, specifically, a first output signal SIGNAL1 that is representative of the instantaneous oxygen concentration of the exhaust gas exiting the vehicle tailpipe 42, and a second output signal SIGNAL2 representative of the instantaneous $NO_x$ concentration in the tailpipe exhaust gas. It will be appreciated that any suitable sensor configuration can be used, including the use of discrete tailpipe exhaust gas sensors, to thereby generate the two desired signals SIGNAL1 and SIGNAL2.

Generally, during vehicle operation, the controller 14 selects a suitable engine operating condition or operating mode characterized by combustion of a "near-stoichiometric" air-fuel mixture, i.e., one whose air-fuel ratio is either maintained substantially at, or alternates generally about, the stoichiometric air-fuel ratio; or of an air-fuel mixture that is either "lean" or "rich" of the near-stoichiometric air-fuel mixture. A selection by the controller 14 of "lean burn" engine operation, signified by the setting of a suitable lean-burn request flag to logical one, means that the controller 14 has determined that conditions are suitable for enabling the system's lean-burn feature, whereupon the engine 12 is alternatingly operated with lean and rich air-fuel mixtures for the purpose of improving overall vehicle fuel economy. The controller 14 bases the selection of a suitable engine operating condition on a variety of factors, which may include determined measures representative of instantaneous or average engine speed/engine load, or of the current state or condition of the trap (e.g., the trap's $NO_x$-storage efficiency, the current $NO_x$ "fill" level, the current $NO_x$ fill level relative to the trap's current $NO_x$-storage capacity, the trap's temperature T, and/or the trap's current level of sulfurization), or of other operating parameters, including but not limited to a desired torque indicator obtained from an accelerator pedal position sensor, the current vehicle tailpipe $NO_x$ emissions (determined, for example, from the second output signal SIGNAL2 generated by the $NO_x$ sensor 40), the percent exhaust gas recirculation, the barometric pressure, or the relative humidity of ambient air.

Figure 2:
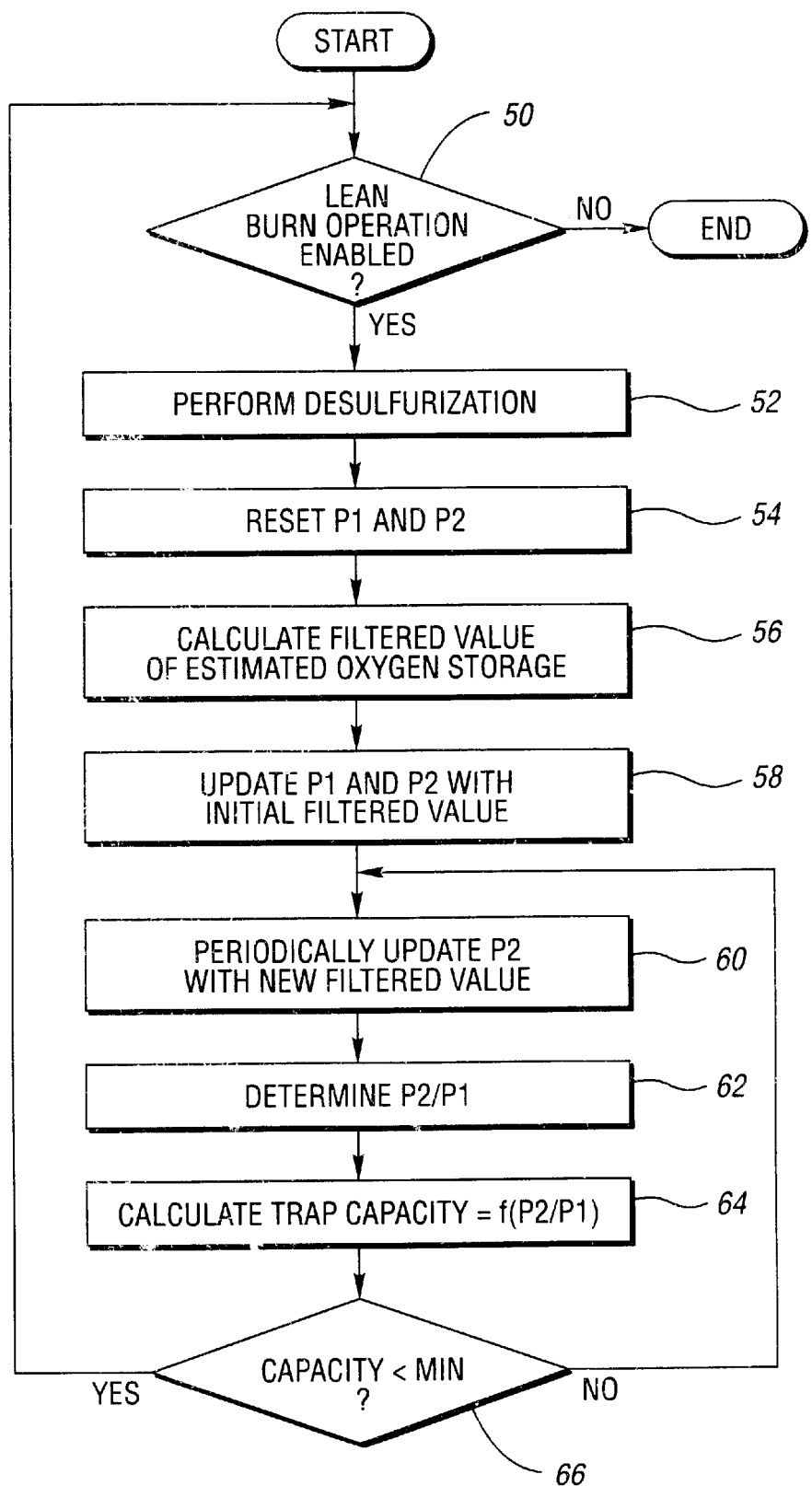
FIG. 2 is a flowchart depicting an exemplary control method for determining trap capacity for storing NO$_x$.

Referring now to FIG. 2, a flowchart of the method for determining the trap's current $NO_x$-storage capacity is shown. The determination of $NO_x$-storage capacity is only made while lean burn operation is enabled as determined at step 50. If lean burn operation is enabled, after a desulfurization operation has been performed at step 52, to put the lean $NO_x$ trap in a known state, the values P1 and P2 are reset at step 54. The value P1 represents the oxygen storage capacity when the lean $NO_x$ trap is fresh, right after a desulfurization event when the capacity is approximately 2.5 grams. The value P2 represents the oxygen storage capacity of the trap as sulfur is introduced into the trap during operation. Initially, while the trap is fresh, a number of oxygen storage measurements are taken as indicated in step 56 in order to calculate a filtered or mean value of the estimated amount of oxygen being stored in the trap when it is fresh. This initial filtered or mean value is then used to update the values of P1 and P2, as indicated in step 58.

Subsequently, and at periodic time intervals the value of the oxygen being stored in the lean $NO_x$ trap is estimated and filtered and the value P2 is updated by this subsequently estimated value as indicated in step 60. The ratio P2/P1 representing the percentage of maximum oxygen storage capacity is calculated in step 62 and the capacity of the lean $NO_x$ trap to absorb $NO_x$ is calculated in step 64 as a function of the value of P2/P1.

To determine the $NO_x$-storage capacity of the lean $NO_x$ trap at any given instance from the oxygen storage capacity of the lean $NO_x$ trap, the relationship between the two is established off-line on an engine or vehicle dynamometer. A mapping of the relationship is then stored in a look up table in computer memory and used in step 64 to determine the $NO_x$-storage capacity of the lean $NO_x$ trap as a function of the ratio P2 to P1. An exemplary method of determining the relationship of $NO_x$ storage capacity and oxygen storage capacity is as follows:

1. Desulphate an aged trap (nominally a 4,000 mile aged trap).
2. Determine the oxygen storage capacity (OX_1) of the desulphated or "fresh" trap using any of the well known methods, for example, integrating the amount of oxygen entering the trap using data from sensors upstream and downstream of the trap.
3. Determined the $NO_x$-storage capacity (NX_1) of the "fresh" trap by integrating the mass rate of $NO_x$ flowing into and out of the trap over a lean cycle of operation
4. Sulphate the trap to various sulfation levels x, based on miles driven with a given sulphur concentration in the fuel, and determined the $NO_x$ stored(NX_x) and oxygen stored (OX_x) at the various sulfation levels.
5. The relationship between oxygen storage capacity at any sulfation level x (OFR_x) and $NO_x$-storage capacity at any sulfation level x (NFR_x) is determined as follows:
   a. Evaluate NFR_x=NX_x/NX_1 and OFR_x=Ox_x/OX_1;
   b. Plot NFR_x versus OFR_x
   c. Fit an equation to the plot to get a relation:

NFR_x=$f$(OFR_x)

The trap capacity calculation performed in steps 60–64 is repeated until the trap capacity falls below a predetermined minimum capacity value MIN, as determined in step 66, whereupon a desulfurization event is performed if lean burn operation is enabled, and the foregoing steps are repeated.

Figure 3:
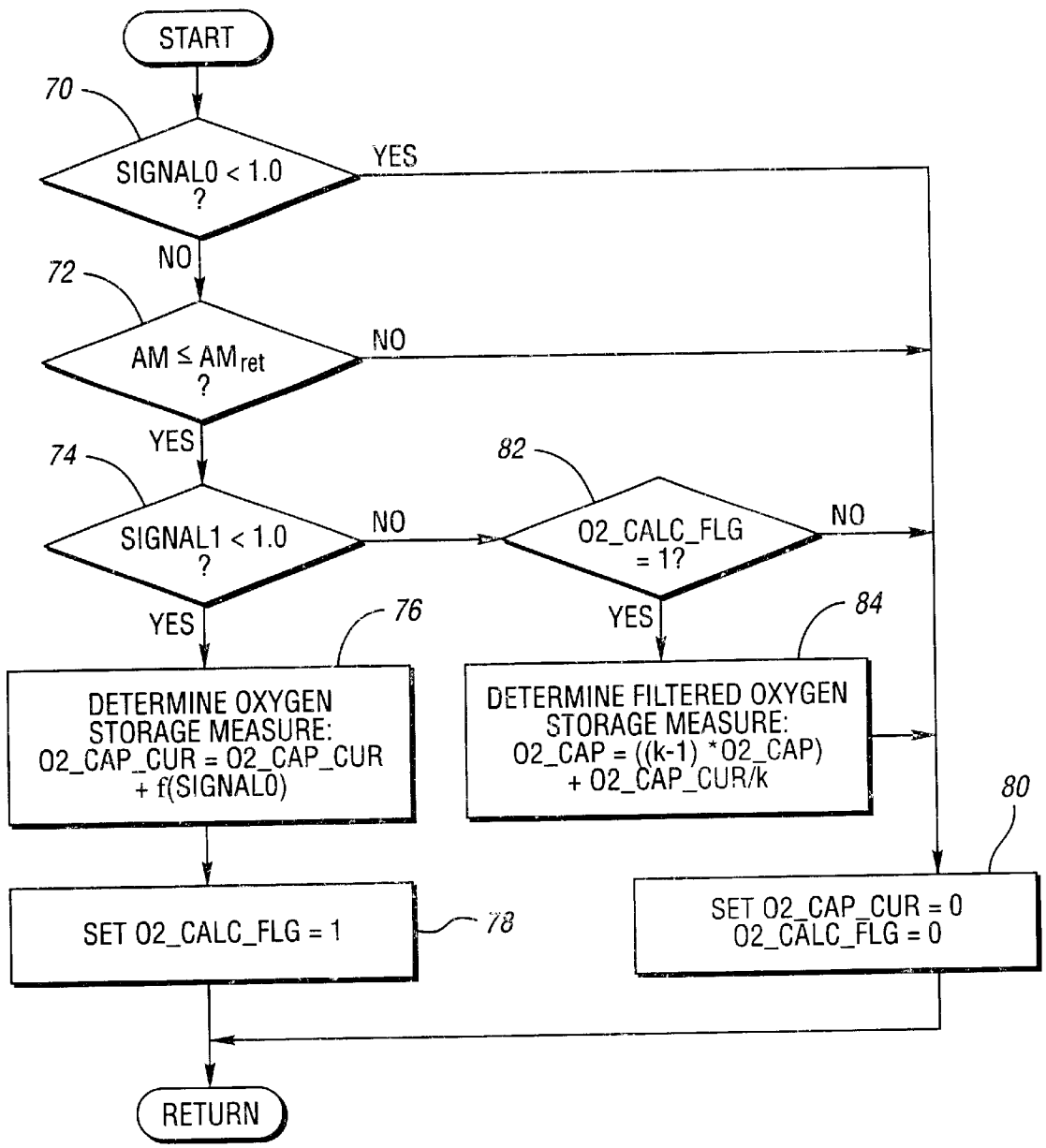
FIG. 3 is a flowchart depicting an exemplary method for determining the nominal oxygen storage capacity of the trap.

The initial oxygen storage capacity determination of step 56 and the subsequent updates determined at step 60 may be calculated by the controller 14 in any suitable manner. In the exemplary system 10, the oxygen storage capacity measure is determined by the controller 14 immediately after a complete-cycle purge event, as illustrated in FIG. 3.

Specifically, during lean-burn operation immediately following a complete-cycle purge event, the controller 14 determines at step 70 whether the air-fuel ratio of the exhaust gas air-fuel mixture upstream of the trap 36, as indicated by the output signal SIGNAL0 generated by the upstream oxygen sensor 38, is lean of stoichiometry. The controller 14 thereafter confirms, at step 72, that the air mass value AM, representing the current air charge being inducted into the cylinders 18, is less than a reference value AMref, thereby indicating a relatively-low space velocity under which certain time delays or lags due, for example, to the exhaust system piping fuel system are de-emphasized. The reference air mass value AMref is preferably selected as a relative percentage of the maximum air mass value for the engine 12, itself typically expressed in terms of maximum air charge at STP (standard temperature and pressure). In the exemplary system 10, the reference air mass value AMref is no greater than about twenty percent of the maximum air charge at STP and, most preferably, is no greater than about fifteen percent of the maximum air charge at STP.

If the controller 14 determines that the current air mass value is no greater than the reference air mass value Amref then, at step 74, the controller 14 determines whether the downstream exhaust gas is still at stoichiometry, using the first output signal SIGNAL1 generated by the $NO_x$ sensor 40. If so, the trap 36 is still storing oxygen, and the controller 14 accumulates a measure O2_CAP_CUR representing the current oxygen storage capacity of the trap 36 using either the oxygen content signal SIGNAL0 generated by the upstream oxygen sensor 38, as illustrated in step 76 of FIG. 3, or, alternatively, from the injector pulse-width, which provides a measure of the fuel injected into each cylinder 18, in combination with the current air mass value AM. At step 78, the controller 14 sets a suitable flag O2_CALC_FLG to logical one to indicate that an oxygen storage determination is ongoing.

The current oxygen storage capacity measure O2_CAP_CUR is accumulated until the downstream oxygen content signal SIGNAL1 from the NOx sensor 40 goes lean of stoichiometry, thereby indicating that the trap 36 has effectively been saturated with oxygen. If either the upstream oxygen content goes to stoichiometry or rich-of-stoichiometry (as determined at step 70), or the current air mass value AM rises above the reference air mass value AMref (as determined at step 72), before the downstream exhaust gas "goes lean" (as determined at step 74), the accumulated measure O2_CAP_CUR and the determination flag O2_CALC_FLG are each reset to zero at step 80. In this manner, only uninterrupted, relatively low-space-velocity "oxygen fills" are included in any filtered value for the trap's oxygen storage capacity.

If the controller 14 determines, at steps 74 and 82, that the downstream oxygen content has "gone lean" following a suitable relatively low-space-velocity oxygen fill, i.e., with the capacity determination flag O2_CALC_FLG equal to logical one, then at step 84, the controller 14 determines the filtered oxygen storage measure O2_CAP using, for example, a rolling average of the last k current values O2_CAP_CUR.

While the best mode for carrying out the invention has been described in detail, those familiar with the art to which this invention relates will recognize various alternative designs and embodiments for practicing the invention as defined by the following claims.

What is claimed is:

1. A method of determining the capacity of a trap to store an exhaust gas constituent comprising a sequence of the steps of:
    performing a depoisoning of said trap whenever the capacity of the trap to store said exhaust gas constituent falls below a predetermined minimum capacity level;
    determining an initial trap oxygen storage value immediately following each of said depoisoning steps;
    periodically updating a current oxygen storage value, after a purge of the trap, by integrating the oxygen content of the engine feedgas until the downstream oxygen content reaches a predetermined value that is less than the oxygen content of engine feedgas, but more than the oxygen content in a stoichiometric exhaust; and
    calculating the capacity of the trap to store said exhaust gas constituent as a function of a relationship between said initial and current oxygen storage values.

2. The method of claim 1 wherein said exhaust gas constituent is $NO_x$, the calculation of the capacity of the trap to store $NO_x$ is restricted to lean burn operation of an engine and the oxygen storage values are filtered values of a plurality of uninterrupted, relatively low-space-velocity oxygen storage measurements.

3. The method of claim 1 wherein the relationship is the ratio of the current to the initial value of oxygen storage.

4. The method of claim 3 wherein the oxygen storage values are filtered values of a plurality of oxygen storage measurements.

5. A system of determining the $NO_x$ storage capacity of a trap containing an oxygen storing element comprising:

means performing a desulfation of said trap whenever the capacity of the trap to store $NO_x$ falls below a predetermined minimum capacity level;

means determining an initial trap oxygen storage value immediately following each of said desulfation steps;

means periodically updating a current oxygen storage value, after a purge of the trap, by integrating the oxygen content of the engine feedgas until the downstream oxygen content reaches a predetermined value that is less than the oxygen content of engine feedgas, but more than the oxygen content in a stoichiometric exhaust; and means calculating the capacity of the trap to store $NO_x$ as a function of a relationship between said initial and current oxygen storage values.

6. The system of claim 5 wherein the calculation of the capacity of the trap to store $NO_x$ is restricted to lean burn operation of an engine and the oxygen storage values are filtered values of a plurality of uninterrupted, relatively low-space-velocity oxygen storage measurements.

7. The system of claim 5 wherein the relationship is the ratio of the current to the initial value of oxygen storage.

8. The system of claim 7 wherein the oxygen storage values are filtered values of a plurality of oxygen storage measurements.

9. An article of manufacture comprising:

a computer storage medium having a computer program encoded therein for determining the capacity of a trap to store an exhaust gas constituent, said computer storage medium comprising:

code for causing a computer to perform a depoisoning of said trap whenever the capacity of the trap to store said exhaust gas constituent falls below a predetermined minimum capacity level;

code for causing the computer to determine an initial trap oxygen storage value immediately following each of said depoisoning steps;

code for causing the computer to periodically update an current oxygen storage value, after a purge of the trap, by integrating the oxygen content of the engine feedgas until the downstream oxygen content reaches a predetermined value that is less than the oxygen content of engine feedgas, but more than the oxygen content in a stoichiometric exhaust; and code for causing the computer to calculate the capacity of the trap to store said exhaust gas constituent as a function of a relationship between said initial and current oxygen storage values.

10. The article of claim 9 wherein the code for causing the computer to calculate the capacity of the trap to store $NO_x$ is implemented only during lean burn operation of an engine and the oxygen storage values are filtered values of a plurality of uninterrupted, relatively low-space-velocity oxygen storage measurements.

11. The article of claim 9 wherein the relationship is the ratio of the current to the initial value of oxygen storage.

12. The article of claim 11 wherein the oxygen storage values are filtered values of a plurality of oxygen storage measurements.

* * * * *